Patented June 22, 1937

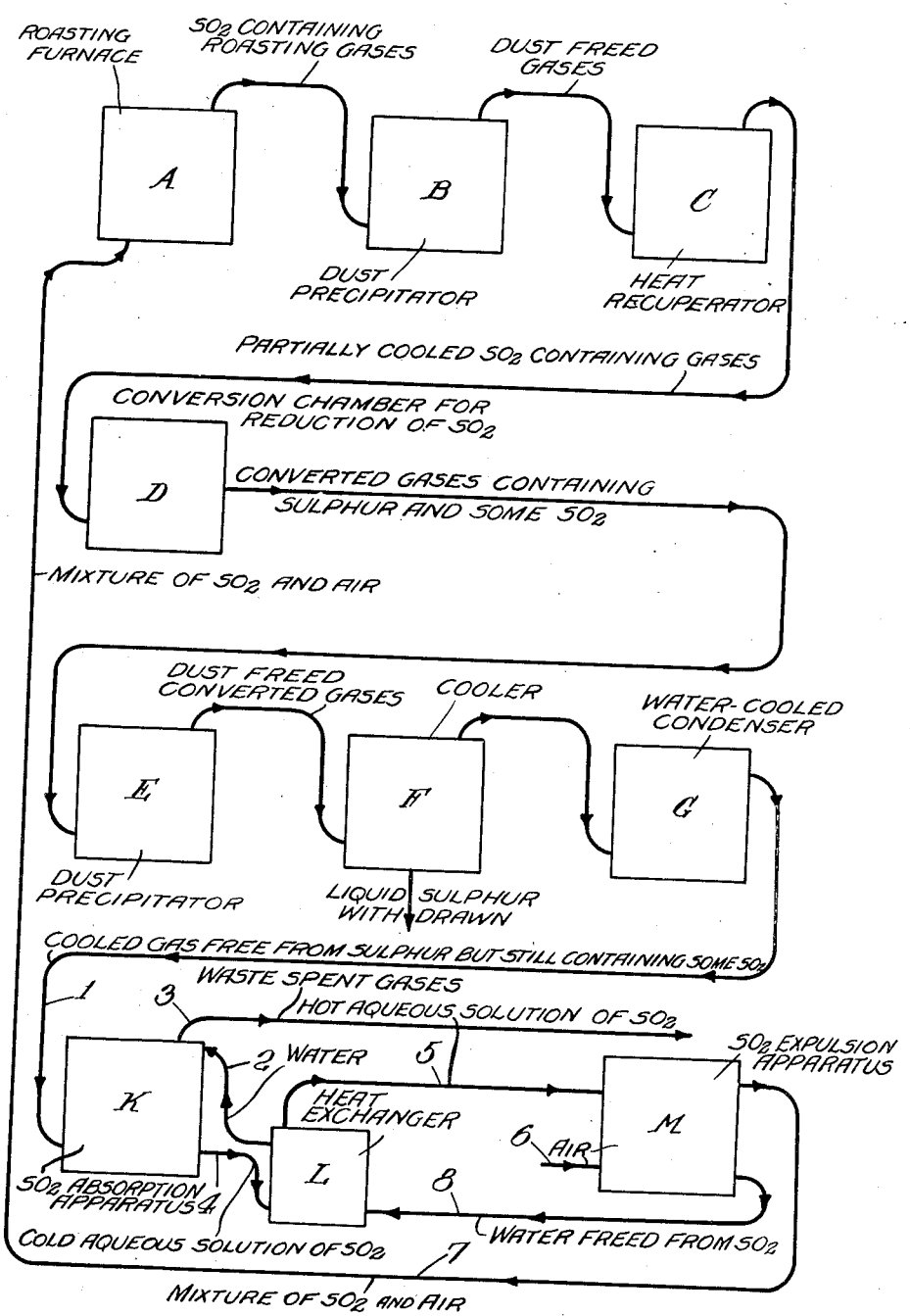

2,084,697

UNITED STATES PATENT OFFICE 2,084,697

PROCESS FOR THE RECOVERY OF SULPHUR FROM SULPHIDE ORES

Sibley Byron McCluskey, London, England

Application June 7, 1934, Serial No. 729,519
In Great Britain June 21, 1933

8 Claims. (Cl. 23—226)

This invention relates to processes for the recovery of sulphur from sulphide ores, and has for its object the recovery of sulphur, in its elemental and substantially pure form, from pyrite or pyrrhotite ores or other iron or non-iron-containing sulphide ores or from sulphurous gases obtained from sulphide ores as a result of metallurgical operations designed primarily to recover substances other than sulphur from such ores.

As is well known the reduction of sulphur dioxide to elemental sulphur can be effected by means of solid carbonaceous or gaseous reducing agents, and amongst the well-known reactions that will theoretically effect this result and that it has been proposed to utilize commercially there may be mentioned the following:—

Solid carbon $2C+2SO_2=2CO_2+S_2$
Carbon monoxide $4CO+2SO_2=4CO_2+S_2$
Methane $CH_4+2SO_2=CO_2+2H_2O+S_2$
Ethylene $2C_2H_4+6SO_2=4CO_2+4H_2O+3S_2$
Hydrogen $4H_2+2SO_2=4H_2O+S_2$ Some reactions with other compounds of sulphur which may be involved are expressed as follows:—

Carbon disulphide $2CS_2+2SO_2=2CO_2+3S_2$
Carbon oxysulphide $4COS+2SO_2=4CO_2+3S_2$
Hydrogen sulphide $4H_2S+2SO_2=4H_2O+3S_2$ In general processes that have heretofore been proposed involving the utilization of one or several of the above mentioned reactions have not been commercially successful for several reasons. Firstly difficulties have attended the control of the composition of the sulphurous gas, principally as regards the ratio of oxygen to sulphur dioxide. Any excess of oxygen beyond that necessary to support combustion and maintain the required temperatures in the contacting mass of reducing material will wastefully combine with the reducing agent to form carbon dioxide, thus entailing excessive and uneconomic consumption of fuel. Secondly the speed of the reaction is retarded as the respective concentrations of the reacting gases approach the equilibrium values, and further it has been shown that a substantially complete and rapid conversion of the sulphur dioxide can only be effected in the presence of a considerable excess of the reducing agent, which would also involve the expenditure of uneconomic amounts of fuel.

The necessity for limiting the oxygen:sulphur dioxide ratio has been recognized and attempts have been made to control it, most of the methods proposed involving the concentration of the sulphur dioxide by methods similar to those employed in the production of liquid sulphur dioxide, and subsequent dilution of the concentrated gas with air in the required proportions. This method however proved unsuccessful, not only because of the necessarily high cost of the concentration of the sulphur dioxide but because a mixture so produced by diluting the concentrated sulphur dioxide with air will be undesirably high in both sulphur dioxide and oxygen if the economic ratio between them is maintained.

It may be mentioned that it has also been proposed in the roasting of pyrites or ferrous sulphide by means of air in a rotary or shaft kiln or mechanical furnace to withdraw from the upper part of the ferrous sulphide combustion zone gas consisting of sulphur dioxide and nitrogen with little or no free sulphur or oxygen, to cool said gas and return the cooled gas to the lower part of the ferrous sulphide combustion zone to regulate the temperature therein, part of the air supply (i. e. the combustion air) being if desired joined with the cooled gas introduced into the lower part of the combustion zone.

According to the present invention a cyclic process for the recovery of sulphur from sulphide ores consists in subjecting the ore to an oxidizing roasting, controlling the concentration of sulphur dioxide in the gases obtained from the roasting operation by introducing into the furnace in which the roasting of the ore is effected a gaseous mixture comprising air and a predetermined proportion of sulphur dioxide, subjecting the sulphur dioxide and oxygen containing gases from the roasting furnace to a reducing reaction in a conversion chamber separate from the roasting furnace so as to effect the reduction to sulphur of a proportion only of the sulphur dioxide in said gases, removing the elemental sulphur from the gases leaving the conversion chamber and thereafter treating the gases to recover their remaining sulphur dioxide and utilizing such sulphur dioxide content mixed with air for the gaseous mixture supplied to the roasting furnace.

The conversion chamber in which the reduction of the sulphur dioxide is effected is fed with solid carbonaceous fuel and the control of the reduction reaction in the conversion chamber so as to avoid uneconomic fuel consumption and to obtain only a partial reduction of the sulphur dioxide to the desired extent is effected by a suitable regulation of the rate of flow of the sulphur dioxide-containing gases into the conversion chamber, the composition of the said gases, and the contact period, which latter is a function of the depth of the fuel bed in the conversion chamber and the velocity of the reacting gases.

As an example of one method of carrying out the process according to the present invention there may be instanced the following procedure for the recovery of elemental sulphur from pyrite ($FeS_2$):—

The pyrite is calcined in any of the usual furnaces adapted to the autogenous roasting of pyritic fines or concentrates. Pyrite roasted in the presence of air reacts according to the equation— $4FeS_2+11O_2=8SO_2+2Fe_2O_3$, and if carried to completion will result in a gas containing about 16.2 per cent sulphur dioxide and 83.8 per cent nitrogen. It is not practicable, of course, to accomplish this. It is possible, however, to produce by ordinary roasting methods as heretofore carried out a gas containing 11–12 per cent sulphur dioxide, with corresponding oxygen content of about 6.7–5.4 per cent, which fulfills the requirements, within practical limits, of the $SO_2:O_2$ ratio of about 2:1, demanded for subsequently effecting efficient reduction in the conversion chamber. In carrying out the present process the production of a gas mixture from the roasting operation high in sulphur dioxide and low in oxygen is facilitated by introducing into the roasting furnace, in place of atmospheric air as is the usual practice, a mixture of air and a small amount of sulphur dioxide, the latter being that recovered from the unconverted excess of sulphur dioxide contained in the gases on leaving the conversion chamber. The volume and/or composition of the gaseous mixture supplied to the roasting furnace is so controlled as to obtain in the gases leaving the roasting furnace the optimum relative proportions of sulphur dioxide and oxygen required to enable the subsequent reduction reaction to be effected as economically as possible, that is, such a quantity of oxygen containing gases is presented as to provide more than sufficient oxygen to oxidize all of the sulphur present in the ore and still to leave a substantial proportion of free oxygen in the exit gases from the roasting furnace. The gas from the roasting furnace, after being cleaned by passing it through a dust precipitator, is passed through waste-heat boilers, economizers, recuperators or similar devices for the utilization of such portion of the heat-content of the gas as may be economically available, after which it may be further freed from condensed fume and suspensoids by one of the usual dust collection methods, such as electrostatic precipitation.

The cleaned gas is next introduced, either with or without the admixture of an accessory reducing gas, into a conversion chamber where it is brought into contact with a mass of incandescent solid carbonaceous fuel, the reduction of a regulated proportion of the sulphur dioxide to sulphur taking place according to one or other of the various equations previously mentioned. In order to effect as complete an oxidation or burning as possible of the solid carbonaceous fuel in the conversion chamber, a comparatively shallow fuel bed is maintained therein, the depth of this bed being preferably several times less than that of the fuel bed used for effecting the reduction operation in the known processes as heretofore worked. In the conversion chamber the rate of flow of the gases (from the roasting furnace) entering the chamber is so controlled in relation to the fuel-feed-rate and the depth or volume of the fuel mass that only a partial reduction of the sulphur dioxide takes place. For example in treating in the conversion chamber a primary gas containing 10 per cent $SO_2$ by volume, maintaining a fuel bed of about ten inches in depth, and with a mean gas temperature of about 1200° C., a gas velocity of about 900 feet per minute and a contact period of about 0.07 second, a conversion of about 75 per cent of the sulphur dioxide to sulphur is effected, the final exit gas from the conversion chamber thus containing 2.5 per cent $SO_2$.

As has been previously mentioned, for practical purposes the ratio of sulphur dioxide to oxygen in the gases supplied to the conversion chamber should be of the order of about 2:1. If the sulphur dioxide is materially increased, the reaction is retarded and combustion may ultimately cease; although the assumed reaction $$(2SO_2+2C=2CO_2+S_2)$$

is exothermic it will not alone support combustion, and the reaction, to proceed, requires the aid of the more highly exothermic $O_2+C=CO_2$, or the intermediate formation of CO and reduction according to the equation $4CO+2SO_2=4CO_2+S_2$. It is therefore necessary to ensure that sufficient oxygen is present. If, however, excessive oxygen is present, an uneconomical fuel consumption results. The present method of supplying to the roasting furnace a gaseous mixture of air and a small proportion of sulphur dioxide enables the composition of the resulting gases obtained from the roasting furnace to be regulated as may be required in order to secure the optimum proportions of sulphur dioxide and oxygen therein so as to enable the partial reduction in the conversion chamber to be effected with a maximum of efficiency.

The gas issuing from the conversion chamber is cleaned, for the removal of solids such as ash and entrained carbon, by one of the usual methods, such as electrostatic precipitation, whereafter it is cooled in a suitable cooling apparatus so as to utilize, as far as is economically possible, the sensible heat of the gas and to reduce the temperature to a degree suitable for the condensation and collection of the sublimed sulphur. A portion of the sulphur collects as a condensate in the cooling apparatus or condenser from which it is withdrawn in liquid form and subsequently solidifies. The gas issuing from the condenser is then further cooled to approximately atmospheric temperature by passing it through a water cooled condenser, whereby a further recovery of precipitated sulphur is effected. The cooled gas leaving the water cooled condenser may then be subjected if desired to an electrostatic precipitation operation so as to remove the last traces of sulphur, the necessity for this step being determined by local economic considerations and the nuisance factor. The cooled gas still contains residual sulphur dioxide which has escaped reduction in the conversion chamber, and this sulphur dioxide content is recovered and, after dilution with air, returned to the circuit to make up the gas mixture supplied to the roasting furnace. By this procedure the circuit is closed and the process is rendered completely cyclic so that all but very minor amounts of the sulphur dioxide formed in the roasting operation are prevented from escaping into the atmosphere. The recovery and utilization of the sulphur dioxide content of the cooled gas as above mentioned may conveniently be effected by bringing the gas into intimate contact with water at about atmospheric temperature so as to form a saturated aqueous solution of sulphur dioxide by absorption of the latter from the gas, for instance by introducing the gas into the bottom of a suitable tower through which it ascends in contact with a downward flowing suitable quantity of water which enters the tower at the top free from sulphur dioxide, and thereafter expelling the dissolved sulphur dioxide from the solution by reversing the procedure, namely by bringing the solution into intimate contact with air, for instance by feeding the saturated aqueous solution of sulphur dioxide into the top of a tower and, during its descent, bringing it into contact with an ascending stream of air which, introduced into the bottom of the tower, gradually takes up the sulphur dioxide from the solution until it issues from the top of the tower as a mixture of air and sulphur dioxide. If the absorption and expulsion operations are carried out at the same temperature, then the sulphur dioxide content will be transferred from the cooled gas to air without any change in the concentration of the sulphur dioxide—for example if the cooled gas contains three per cent of sulphur dioxide, there will also be this same proportion of sulphur dioxide in the mixture of air and sulphur dioxide ultimately obtained, this mixture being a suitable one for supply, in place of ordinary air, to the roasting furnace. Should it be desired to increase the sulphur dioxide content of the air beyond that of the initial cooled gas, then it is only necessary to raise the temperature of the media in the expulsion stage to the necessary degree.

The procedure above described is illustrated in flow sheet manner in the accompanying diagrammatic drawing as follows:—

A is the roasting furnace in which the pyrite is calcined; from the furnace A the gases obtained from the roasting operation pass into the dust precipitator B and thence through a heat recuperator C into the conversion apparatus D where a proportion (about 75 per cent for example) of the sulphur dioxide content of the gases is reduced to sulphur. The hot gases and vapours from the conversion apparatus D, after passing through a dust precipitator E, enter a cooler or condenser F, where a portion of the sulphur collects as a condensate and is withdrawn in liquid form; the gases issuing from F are further cooled by passing them through a water cooled condenser G, whereby a further recovery of precipitated sulphur is effected. The cooled gas discharged from the condenser G still contains some residual sulphur dioxide, and this is recovered by means of the sulphur dioxide recovery system K, L, M, K being the sulphur dioxide absorption apparatus, L a heat exchanger and M the sulphur dioxide expulsion apparatus. The gases from the condenser G enter the apparatus K by the pipe line 1 near the bottom and after giving up their sulphur dioxide to the water which enters K at the top through the pipe line 2, escape as waste spent gases through the pipe line 3. The aqueous solution of sulphur dioxide leaves the apparatus K by the pipe line 4 and after passing through the heat exchanger L and along the pipe line 5 enters the sulphur dioxide expulsion device M. Air is introduced by the pipe line 6 at the bottom of M and gradually takes up the sulphur dioxide until it issues from the top of M as a mixture of air and sulphur dioxide which is then supplied by the pipe line 7 to the roasting furnace A. The spent liquor from M, after passing by the pipe line 8 to the heat exchanger L, leaves the latter by the pipe line 2 and constitutes the water supply for the sulphur dioxide absorption apparatus K.

What I claim and desire to secure by Letters Patent of the United States is:—

1. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a ratio of sulphur dioxide to oxygen of the order of about 2 to 1 in the exit gases from the roasting furnace, reducing to sulphur in a separate conversion chamber containing solid carbonaceous fuels, a portion only of the sulphur dioxide in the exit gases from the roasting furnace, removing the elemental sulphur from the gases leaving the conversion chamber, thereafter treating the gases to recover the remaining sulphur dioxide contained therein, and utilizing such sulphur dioxide content mixed with air for the gaseous mixture supplied to the roasting furnace.

2. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a gas mixture comprising about 11 to 12% of sulphur dioxide and about 5.4 to 6.7% oxygen in the exit gases from the roasting furnace, reducing to sulphur, in a separate conversion chamber containing solid carbonaceous fuel, a portion only of the sulphur dioxide in the exit gases from the roasting furnace, removing the elemental sulphur from the gases leaving the conversion chamber, thereafter treating the gases to recover the remaining sulphur dioxide contained therein, and utilizing such sulphur dioxide content mixed with air for the gaseous mixture supplied to the roasting furnace.

3. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a ratio of sulphur dioxide to oxygen of the order of about 2 to 1 in the exit gases from the roasting furnace, reducing to sulphur, in a separate conversion chamber containing solid carbonaceous fuel, about 75% of the sulphur dioxide content of the exit gases from the roasting furnace, removing the elemental sulphur from the gases leaving the conversion chamber, thereafter treating the gases to recover the remaining sulphur dioxide contained therein, and utilizing such sulphur dioxide content mixed with air for the gaseous mixture supplied to the roasting furnace.

4. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a gas mixture comprising about 11 to 12% of sulphur dioxide and about 5.4 to 6.7% oxygen in the exit gases from the roasting furnace, reducing to sulphur, in a separate conversion chamber containing solid carbonaceous fuel about 75% of the sulphur dioxide content of the exit gases from the roasting furnace, removing the elemental sulphur from the gases leaving the conversion chamber, thereafter treating the gases to recover the remaining sulphur dioxide contained therein, and utilizing such sulphur dioxide content mixed with air for the gaseous mixture supplied to the roasting furnace.

5. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a ratio of sulphur dioxide to oxygen of the order of about 2 to 1 in the exit gases from the roasting furnace, reducing to sulphur, in a separate conversion chamber containing solid carbonaceous fuel, a portion only of the sulphur dioxide in the exit gases from the roasting furnace, removing the elemental sulphur from the gases leaving the conversion chamber, recovering the remaining sulphur dioxide content of the gases by absorption thereof with water and thereafter bringing the resulting solution into intimate contact with air to expel the sulphur dioxide from the solution, and utilizing such sulphur dioxide content mixed with air for the gaseous mixture supplied to the roasting furnace.

6. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a gas mixture comprising about 11 to 12% of sulphur dioxide and about 5.4 to 6.7% oxygen in the exit gases from the roasting furnace, reducing to sulphur, in a separate conversion chamber containing solid carbonaceous fuel, a portion only of the sulphur dioxide in the exit gases from the roasting furnace, removing the elemental sulphur from the gases leaving the conversion chamber, recovering the remaining sulphur dioxide content of the gases by absorption thereof with water and thereafter bringing the resulting solution into intimate contact with air to expel the sulphur dioxide from the solution, and utilizing such sulphur dioxide content mixed with air for the gaseous mixture supplied to the roasting furnace.

7. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a ratio of sulphur dioxide to oxygen of the order of about 2 to 1 in the exit gases from the roasting furnace, reducing to sulphur, in a separate conversion chamber containing solid carbonaceous fuel, about 75% of the sulphur dioxide content of the exit gases from the furnace, removing the elemental sulphur from the gases leaving the conversion chamber, recovering the remaining sulphur dioxide content of the gases by absorption thereof with water and thereafter bringing the resulting solution into intimate contact with air to expel the sulphur dioxide from the solution, and utilizing such sulphur dioxide content mixed with air for the gaseous mixture supplied to the roasting furnace.

8. A cyclic process for the recovery of sulphur from sulphide ores which comprises subjecting the ore to an oxidizing roasting, supplying such an amount of sulphur dioxide and oxygen-containing gases to the roasting chamber as will furnish oxygen in excess of that required to oxidize the sulphur contained in the ore and create a gas mixture comprising about 11 to 12% of sulphur dioxide and about 5.4 to 6.7% oxygen in the exit gases from the roasting furnace, reducing to sulphur, in a separate conversion chamber containing solid carbonaceous fuel, about 75% of the sulphur dioxide content of the exit gases from the furnace, removing the elemental sulphur from the gases leaving the conversion chamber, recovering the remaining sulphur dioxide content of the gases by absorption thereof with water and thereafter bringing the resulting solution into intimate contact with air to expel the sulphur dioxide from the solution, and utilizing such sulphur dioxide content mixed with air for the gaseous mixture supplied to the roasting furnace.

SIBLEY BYRON McCLUSKEY.